United States Patent
Girard et al.

(10) Patent No.: US 7,360,247 B2
(45) Date of Patent: Apr. 15, 2008

(54) METHOD FOR PROTECTION AGAINST FRAUDULENT MODIFICATION OF DATA SENT TO A SECURE ELECTRONIC MEDIUM

(75) Inventors: Pierre Girard, La Ciotat (FR); Jean-Luc Giraud, Aubagne (FR)

(73) Assignee: Gemplus, Gemenos (FR)

( * ) Notice: Subject to any disclaimer, the term of this patent is extended or adjusted under 35 U.S.C. 154(b) by 909 days.

(21) Appl. No.: 10/276,920

(22) PCT Filed: May 17, 2001

(86) PCT No.: PCT/FR01/01522

§ 371 (c)(1),
(2), (4) Date: Jan. 3, 2003

(87) PCT Pub. No.: WO01/92996

PCT Pub. Date: Dec. 6, 2001

(65) Prior Publication Data

US 2004/0088555 A1    May 6, 2004

(30) Foreign Application Priority Data

May 31, 2000   (FR) .................................. 00 07041

(51) Int. Cl.
*G06F 21/00* (2006.01)
*H04L 9/00* (2006.01)
*H04K 1/00* (2006.01)

(52) U.S. Cl. ........................... 726/20; 726/9; 713/176; 713/185; 713/189

(58) Field of Classification Search ..................... None
See application file for complete search history.

(56) References Cited

U.S. PATENT DOCUMENTS

| | | | |
|---|---|---|---|
| 5,596,718 A | 1/1997 | Boebert et al. | |
| 5,844,497 A | 12/1998 | Gray | |
| 6,669,096 B1 * | 12/2003 | Saphar et al. | 235/492 |
| 7,047,558 B1 * | 5/2006 | Mariana | 726/3 |
| 7,296,149 B2 * | 11/2007 | Hiltgen | 713/161 |
| 7,296,160 B2 * | 11/2007 | Hiltgen | 713/172 |
| 2001/0054148 A1 * | 12/2001 | Hoomaert et al. | 713/172 |
| 2002/0019939 A1 * | 2/2002 | Yamamoto et al. | 713/172 |

FOREIGN PATENT DOCUMENTS

| | | |
|---|---|---|
| EP | 0587375 A2 | 3/1994 |
| EP | 0763791 A1 | 3/1997 |
| FR | 2749680 A1 | 12/1997 |
| WO | WO 99/06970 * | 2/1999 |
| WO | WO00/17758 | 3/2000 |

* cited by examiner

*Primary Examiner*—Christopher Revak
(74) *Attorney, Agent, or Firm*—Buchanan Ingersoll & Rooney PC (57) ABSTRACT

A method for protection against modification of data sent by a user to a secure medium via a reader selects and stores some of the data. Confirmation of the authenticity of the selected data is obtained by verifying whether they are identical to those input on request by the user in a secure communication mode of the reader. The method is applicable to the protection against the modification of a command and/or a document signed with an electronic signature.

24 Claims, 4 Drawing Sheets

Fig. 1

```
<contract>
I the undersigned <signer>Pierre Girard</signer> <object>certify
that I owe</object> the sum of <amount>ninety
<currency>francs</currency></amount> to <party>Mr Jean-Luc
Giraud</party>. Effected <date>31 January 2000</date>
<where>in
Gemenos</where>.
</contract>
```

Fig. 2

```
           1111111111222222222233333333
  1234567890123456789012345678901234567890123456789
1 I the undersigned Pierre Girard certify
2 that I owe the sum of ninety francs to
3 Mr Jean-Luc Giraud.
4 Effected 31 January 2000 in Gemenos.
```

METHOD FOR PROTECTION AGAINST FRAUDULENT MODIFICATION OF DATA SENT TO A SECURE ELECTRONIC MEDIUM

This disclosure is based upon French Application No. 00/07041, filed on May 31, 2000 and International Application No. PCT/FR01/01522, filed May 17, 2001, the contents of which are incorporated herein by reference.

BACKGROUND OF THE INVENTION

The invention relates to a method for protection against fraudulent modification of data sent by a user to a secure medium (a smart card for example). Such data can be constituted by a command and/or a message accompanied by an electronic signature for its authentication. The invention should be seen in a context where the secure medium is coupled to a PC (Personal Computer, designating a home computer) via a reader.

With the development of electronic commerce, whether company to company or company to private individual, the necessity is appearing of achieving a legal framework allowing any disputes to be resolved before a court. This legal framework is starting to be put in place, whether in Europe or the United States, with the recognition of the electronic signature as a means of proof.

Under these conditions, it is important to consider the technical means to be implemented for generating reliable electronic signatures, that is to say those which are the least disputable possible. Generally, use is made of public key cryptography techniques which make it possible to generate digital signatures for digital documents. The majority of the cryptography algorithms commonly used, such as DSA, Schnorr or El Gamal for example, make use of a hash function in the electronic signature generation method. Such a pseudo-random function consists of converting the initial text to be signed into a hashed text which breaks the linearity of the signature generation.

Electronic signature generation algorithms are generally installed using hardware and software, conventionally a PC provided with software and the public key, and a secure medium containing the secret key of the user and the cryptographic signature algorithms.

According to application, the secure medium can be a smart card or a PCMCIA card for example. The majority of portable PCs are provided with a PCMCIA integrated reader. Certain of these cards in the PCMCIA format can even be smart card readers.

It is assumed subsequently that the electronic signature is generated from a smart card requiring the use of an authentication code (PIN code) and that the reader is a very simple coupler of the GemPC420 type having neither keyboard nor screen. This is because readers with such inputs/outputs (of the GCR500 type) are much more expensive and are rarely found connected to a PC since they are standalone, but the implementation of the invention would however be facilitated by their use.

Conventionally, it is considered that an electronic signature generation method must produce a signature having the following properties:

Authenticity: a valid signature implies the deliberate wish of the user to sign the document with which the signature is associated. The signature protocol must therefore guarantee the active participation of the user and of him alone. Consequently it is necessary to authenticate said user prior to the signing. In a system using a smart card, two elements guarantee the active presence of the user: the presence of a physical element which he alone possesses (the card) and the input of data which he alone knows (a PIN code or a password).

Impossibility of falsification: only the user must be in a position to generate a signature for a given document. This property is guaranteed by the use of cryptographic algorithms considered as secure and of a reliable public key infrastructure, as well as by the use of a means for storing the keys which is resistant to physical and logical attacks (a smart card for example).

Non-reusability: the signature associated with a document cannot be reused and associated with another document, that is to say it must be possible to detect any modification of the message associated with the signature. This property is guaranteed by the known methods using a hash function and algorithms for generating random digital signatures by calling upon random numbers regenerated between each signature.

Non-repudiation: the user of the document cannot deny having deliberately signed a document after having done so. This property depends on the overall security of the system, and is therefore true only if the probability of attacking the system is negligible. In the contrary case a user can repudiate his signature by putting forward the weakness of the system as an argument. It must be noted that first party attacks must be taken into account at that level.

This is because a user can deliberately introduce a flaw into the system in order to be able, a posteriori, to repudiate his signature. For example, if the user himself generates his public key, he can deliberately choose a weak key while subsequently claiming to have chosen a key at random which proved to be weak and has been cracked.

It is considered, in general, that systems using a PC and smart cards are sufficiently reliable to guarantee the non-repudiable nature of generated signatures. However, attacks by means of Trojan horses have developed sufficiently lately for this point of view to be legitimately questioned.

A Trojan horse is defined as a malicious code section which conceals itself in a program performing commonplace tasks.

The operating systems currently used on home PCs, as well as the lack of vigilance of users, means that it is very easy to introduce a program including a Trojan horse into a PC and that the Trojan horse, once in place, has all possible rights. Thus, for example, Trojan horses can be concealed in popular and freely available programs or in shareware on the Internet such as screen savers for example. There are also generic Trojan horses such as "Back Orifice" which make it possible to take total control of a remote PC and to modify all or some of its content, or Trojan horses which exploit an error (bug) in a network program (for example Internet Explorer).

There are numerous attacks which can be carried out by Trojan horses, but three main ones will be considered:

Theft of the PIN code of the user: the PIN (Personal Identification Number) code constitutes an authentication value allowing the card holder to be authenticated. A Trojan horse, installed somewhere in the operating system, in an applications software package, in the card reader drivers or in the drivers specific to the card, is in a position to copy the PIN code which is entered by the user and transmit it to the originator of the Trojan horse. Subsequently, all that remains is for said originator to steal the card from its legitimate owner and use it without his knowledge.

Modification of a command issued by the user destined for the card.

For example, such an attack can be carried out at the time of a request for generating a key on board the card by the PC. The Trojan horse can intercept this command, itself generate a key, customise the card with this key and transmit a copy thereof. In such a case, it is obvious that the properties associated with the electronic signature are lost, since the owner of the card is no longer the only one able to produce a valid signature.

Modification of the document to be signed between its viewing by the user and its signing by the card.

When the user enters his PIN code in order to signify his approval, the applications software transmits the document to be signed to the card which hashes it before signing it (the context here is one where the volume of data to be signed is not incompatible with the processing capabilities of a smart card).

However, a Trojan horse can intercept the data transmitted to the card and modify them. The user will then have signed a document which he will not only not have approved, but also never seen. It is clear that such a situation is not acceptable. It then becomes obvious that, with electronic commerce and electronic signatures becoming widespread, such attacks can be used as an argument for refuting signatures.

The particular problem of theft of the PIN code is today taken into account and mastered in systems integrating modern smart card readers like for example the GemPC420. Such a reader, shown schematically in FIG. 1, has a specific mechanism, commonly referred to as a "trusted path" or computer security secure path, intended to avoid PIN code theft by a Trojan horse.

Figure 1:
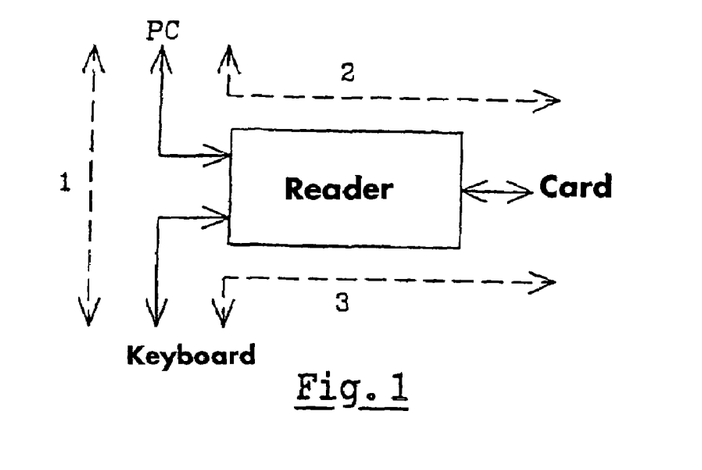
FIG. 1, already described, is a diagram of the GemPC420 card reader.

FIG. 1 depicts the principle of operation of the GemPC420. This is placed between the PC and the keyboard. It is therefore in a position to interrupt all communications between the keyboard and the PC. The reader has three modes of operation, corresponding to three communication circuits between the PC, the keyboard and the smart card reader. These circuits are numbered 1 to 3 in FIG. 1.

Circuit 1 corresponds to a mode of operation where the card is not used and where the PC dialogues with the keyboard. Circuit 2 corresponds to a mode of operation where the PC dialogues with the card by means of the APDU (Application Protocol Data Unit) defined by the ISO standard for standardising exchanges between a reader and a card. Finally, circuit 3 corresponds to the trusted path: the reader cuts communication between the PC and the keyboard and the keys pressed by the user are sent directly to the card by the reader. The reader goes into mode 3 on the order of the PC and then completes the APDU sent to the card by the PC with the codes of the keys pressed by the user.

For more security and ease of use, a light emitting diode (LED) flashes on the reader to signify that the latter is in mode 3, and only in that case.

A Trojan horse is therefore unable to intercept the PIN code of the user, since this code does not at any time pass through the PC. The user must enter his PIN code only when the reader is in trusted path mode indicated by the flashing LED. This is because a Trojan horse can display a message on the screen inviting the user to enter his PIN code without, for all that, switching the reader into trusted path mode. In this case, the reader would not cut the keyboard to reader communication and the Trojan horse would obtain the PIN code.

In conclusion, it is clear that the GemPC420 card reader solves the problem of theft of the PIN code by a Trojan horse. There also exist other readers, using other technologies, which can achieve the same results.

Use can be made for example of readers using the USB (Universal Serial Bus) communication protocol on a computer equipped with a USB keyboard (like for example the Apple computers). The principle is very similar to that described previously: the card reader possesses two USB connectors. The first connects to one of the USB ports of the computer and the second is used for connecting the keyboard. In normal circumstances, the reader transmits the information exchanged between the keyboard and the computer. When it receives an isolation command on its channel, the reader cuts the connection between the keyboard and the PC. The information which is then typed on the keyboard is not sent to the computer but used directly by the reader. A PIN code entered in this way therefore never enters the PC and thus does not risk being the target of a Trojan horse.

In the remainder of this document, the starting principle is that the solution uses a GemPC420 reader, but it is clear that any other reader having a trusted path, like for example a USB reader which has just been described, can also be used.

Besides the problem of theft of the PIN code, there remains to be solved the problem of modification of a command and/or of a document to be signed.

At the moment, a Trojan horse present for example in a reader driver can modify the document sent to the card for signature after acceptance thereof by the user. For example the document "I the undersigned X acknowledge that I owe FF10 to Y" can be changed by the Trojan horse into "I the undersigned X acknowledge that I owe FF10000 to Y".

A Trojan horse can also modify a command, for example by itself generating a key of which it keeps a copy and sending the order to the card to store this key, instead of sending the order to the card to generate an on-board key.

SUMMARY OF THE INVENTION

The aim of the present invention is to remedy this problem and propose a novel solution for resolving this type of attack.

To that end, the present invention proposes a method implemented by a system consisting of a card coupled to a computer provided with specific software. The card selects and stores a certain number of data items sent by the user and requests confirmation, in a secure communication mode which does not pass through the PC, of the authenticity of said data items.

To do this, the card requests the user to enter at the keyboard all or part of the issued command or words selected from the initial text to be signed, and then it verifies that they are indeed identical to those it received initially.

The method according to the invention essentially consists of verifying that no attack aimed at modifying a command and/or a document to be signed has taken place before proceeding with the execution of the command and/or the generation of the electronic signature of said document.

The object of the invention is more particularly a method for protection against modification of data sent by a user to a secure medium via a reader, characterised in that it consists of selecting and storing certain of the data items and of obtaining confirmation of the authenticity of said selected data items by verifying that they are identical to those entered on request by the user in a secure communication mode of the reader.

According to a first application of the method according to the invention, the data is a command.

According to a variant, the command is a key generation command.

According to a second application of the method according to the invention, the data is a document signed with an electronic signature generated by the secure medium.

According to one characteristic, the method consists of selecting and storing certain words of the document to be signed and of obtaining confirmation of the authenticity of said document by verifying that said selected words are identical to those entered on request by the user in a secure communication mode of the reader.

According to one characteristic, the words selected for confirmation are selected by the user in a secure communication mode.

According to another characteristic, the words selected for confirmation are selected by the secure medium.

According to one characteristic, the words selected by the secure medium are selected randomly.

According to another characteristic, the words selected by the secure medium are selected deterministically, the document to be signed being a structured document.

According to one variant implementation, the secure medium selects for confirmation the words corresponding to numbers.

According to one variant implementation, the method also consists of requesting confirmation of the location in the document of the words selected for confirmation.

According to one characteristic, the location of the selected words is defined by the line and column numbers of the document to be signed.

According to one variant implementation, the secure medium selects as confirmation words an entire column and/or an entire line of the document to be signed.

According to one characteristic, the document to be signed is in ASCII format.

The invention also relates to a terminal capable of communicating with a secure medium by means of a reader having a secure mode of communication between the medium and the reader, said secure mode not making any information pass through the terminal, said terminal having a program capable of implementing the following steps:

sending of data to the secure medium;
request for entry of confirmation data;
sending of confirmation data to the secure medium in a secure communication mode.

According to one characteristic, the terminal comprises at least one function key or a sequence of function keys reserved for activating the secure mode.

According to one characteristic, the terminal also comprises a mini-scanner having a secure mode of communication with the terminal.

According to one application, the terminal is constituted by a mobile telephone (GSM).

According to another application, the terminal is constituted by a personal computer.

According to another application, the terminal is constituted by a smart card provided with an integrated screen and keyboard.

According to another application, the terminal is constituted by a personal digital assistant (PDA).

According to one application, the secure medium is constituted by a smart card.

According to another application, the secure medium is constituted by a PCMCIA card.

The invention also relates to a smart card capable of communicating with a terminal via a reader having a secure communication mode, characterised in that it has a program capable of implementing the following steps:

selection and storage of data received from the terminal in a non-secure communication mode;
request for confirmation of said data;
comparison of the stored data with those received in confirmation from the terminal in the secure communication mode.

The present invention provides an effective solution to the modification by a Trojan horse of commands or documents signed by a smart card. The criticism which can be made of this method is its lack of ergonomics for the user, but it is rare that an increase in security is made without constraint and, furthermore, the security/ergonomics ratio can be adjusted at will.

BRIEF DESCRIPTION OF THE DRAWINGS

The specific features and advantages of the invention will emerge clearly from a reading of the description which follows, given by way of an illustrative and non-limitative example, with reference to the accompanying figures in which.

DETAILED DESCRIPTION

There is described first the method according to the invention in its application to protection against modification of a document to be signed.

If the previous example is taken again of a text "I the undersigned X certify that I owe 10 francs to Y" and if, by an attack, the Trojan horse modifies the word 10 to 10000, the method according to the invention must be in a position to expose it.

To that end, the word 10 is selected for confirmation. The card then requests the application to highlight (for example in red or bold) the word to be entered for verification by the user and to display a message of the type "Please enter the highlighted word for confirmation". The Trojan horse, receiving the word 10000 from the card, will highlight the word 10 in the text displayed on the screen of the user who will enter 10. If the entry is made in normal mode (mode 1 of the GemPC420), the Trojan horse will have the opportunity to replace the keys entered by the user by 10000 and the card will successfully perform the comparison between 10000 and 10000. If the entry exploits the security of the reader (mode 3 of the GemPC420), the Trojan horse will not be able to modify the keys pressed by the user and the card will compare 10 and 10000 thus detecting the modification of the document.

It then appears clearly that the solution proposed by the present invention does not definitely detect an attack. If, in the preceding example, the card selects for verification a word of the document which has not been modified by the Trojan horse (for example "undersigned"), it will not detect the attack and will sign the modified document. It is therefore important to implement the solution of the invention in such a way that an attack, even if it remains possible, has a negligible probability of succeeding.

It appears that the choice of the words to be confirmed and their number have a determining importance.

As regards the number of words to be confirmed, it is a question essentially of a compromise between the degree of security desired and the inconvenience occasioned by entering the confirmation. Maximum security is obtained when the user re-enters the complete text of the document to be signed. In practice the number of confirmation words will depend on the degree of security desired and the objects to be protected of the application context.

As regards the choice of the words to be confirmed, a number of constraints must be taken into account. On the one hand, are the words to be confirmed chosen by the user and/or by the card, and on the other hand, are these words chosen randomly and/or deterministically.

Furthermore, a preliminary comment is essential as regards the choice of the words to be confirmed. This is because it has been considered until now that the document to be signed was a text in a format intelligible by the card and of which the words could be compared directly with an entry at the keyboard.

A text in ASCII format easily satisfies these criteria. A document in a proprietary format (for example Microsoft Word) is not usable directly. On the other hand, it is entirely possible to export an ASCII version of a Microsoft Word document to be signed. This version must be viewed by the user, since this will be the one which will form the reference in the event of contesting the transaction or the contract. An intermediate solution could consist of using RTF (Rich Text Format) which makes it possible to add presentation attributes to the text (bold, underlined) while retaining ASCII coding. The price to be paid is an RTF analyser on board the card.

The present invention can in fact be applied to any text format whatsoever, but it should be noted that certain formats are more practical than others. There can be imagined for example (even if the technologies are more difficult to implement) "bitmap" formats (obtained for example by digitizing a paper document) compared with an input on a touch pad (touch screen) of the keyboard or a device of the graphics pad type. Such a device would allow for example the signing of drawings for which the user would no longer confirm words but portions of drawings which it would reproduce.

Subsequently it will be considered that a text in ASCII format is concerned.

Figure 2:
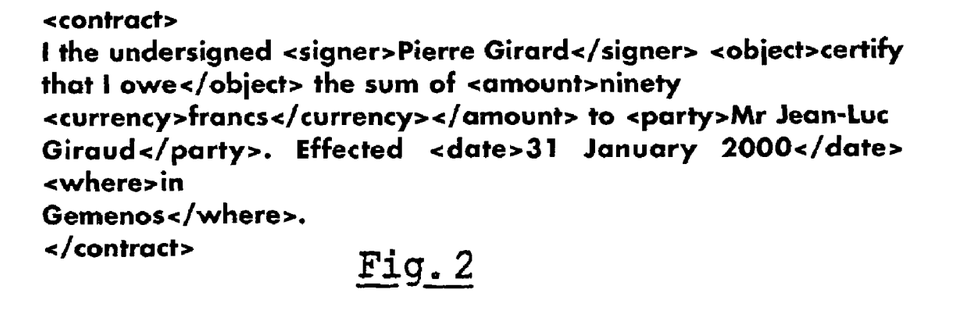
FIG. 2 depicts an example of structured text to be signed.

In the description that follows, with reference to FIGS. 2 and 3, an example text to be signed is considered, written as follows: "I the undersigned Pierre Girard certify that I owe the sum of ninety francs to Mr Jean-Luc Giraud. Effected 31 Jan. 2000 in Gemenos".

A first important point in the implementation of the method according to the invention is determining whether the choice of the words to be confirmed is made by the card and/or by the user.

As the choice, by the card, of words to be confirmed can alight upon insignificant terms of a contract or a document (like "undersigned" in the present example), it could be thought that the user is the most capable of designating the important terms of the document. He can indicate to the card, in mode 3 of the reader, which words he wishes to confirm before said card receives the document. When the card receives the document and requests confirmation, the user confirms, in mode 3 of the reader, the planned words.

Nevertheless, this method does not defend the system against first party attacks in which users can request the card to have insignificant words in the document ("undersigned" in the present example) confirmed, and subsequently repudiate their signature by claiming to have been a victim of a Trojan horse.

In order to obtain a maximum level of security, it is advantageous to achieve a compromise in which the words to be confirmed are selected equally by the user (defense against Trojan horses) and by the card (defense against first party attacks).

A second important point in the implementation of the method according to the invention is determining whether the choice of the words to be confirmed is random or deterministic.

When the user chooses the words to be confirmed, his behaviour is a priori unpredictable and he will use his common sense in order to choose the essential words of the document. A Trojan horse will therefore have only a very small chance of successfully carrying out an attack.

Regarding the choice of words to be confirmed by the card, it is possible to waver between a random strategy or a deterministic choice algorithm. The random strategy is by definition unpredictable for a Trojan horse. Nevertheless, if the ratio between the quantity of insignificant words and the number of confirmation words is very large in the document, the card, choosing words at random, will have very little chance of alighting upon a word which is a potential target for a Trojan horse or a first party attack.

In order to avoid this problem, the card can attempt to determine the important words of the document. All the sums and the dates for example can immediately be thought of. However such an algorithm is relatively difficult to implement as it stands.

In order to facilitate the interpretation of the text by the card and the choice of relevant words for confirmation, structured text, for example in XML (Extended Mark-up Language), can advantageously be transmitted to the card, which necessitates having the corresponding analyser on board the card. Such a structured text is illustrated in FIG. 2. The card can thus select for confirmation important elements such as dates or sums.

Standard texts "with holes" can also be imagined, where only the name information, dates and amounts for example, would remain to be filled in.

Finally it should be noted that the card can have a mixed strategy, supplementing its deterministic choice with randomly chosen words.

Besides the choice and the number of words to be confirmed, it is important to designate these words precisely.

This is because it is obvious that confirmation of the presence of a certain number of words in a document is not sufficient to fix the meaning thereof. It is also necessary to make sure that the order of the words is complied with. For example, it is important to make sure that the words "one hundred and" have not been added between the words "of" and "ninety". It will therefore be important to designate precisely the respective location of the words "of" and "ninety".

Figure 3:
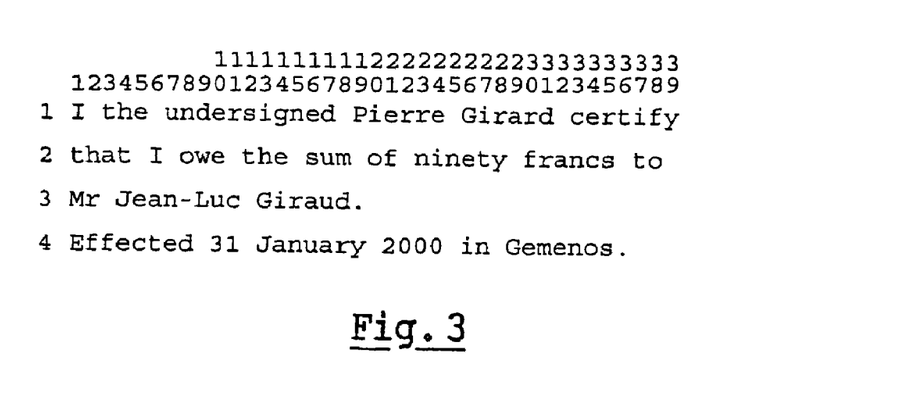
FIG. 3 depicts an example of text to be signed organised in lines and columns.

For this, use can be made of a text organized in lines and columns, as illustrated in FIG. 3, in order to designate precisely the location of the words to be confirmed.

Upon entry of the confirmation words, the card can thus request the user to enter for confirmation the words number 5 to 8 of line 2 and word 1 of line 3. The user will then enter the requested words and their location in the text. One convention could be "l2w6 of" in order to confirm the word "of" in position 6 of line 2.

In order to avoid deletions, insertions and movements of words, one possible strategy consists of requesting confirmation of columns of the text. In the present example, if the card requests confirmation of column 14, the user will enter "c14 g e i a".

Figure 4:
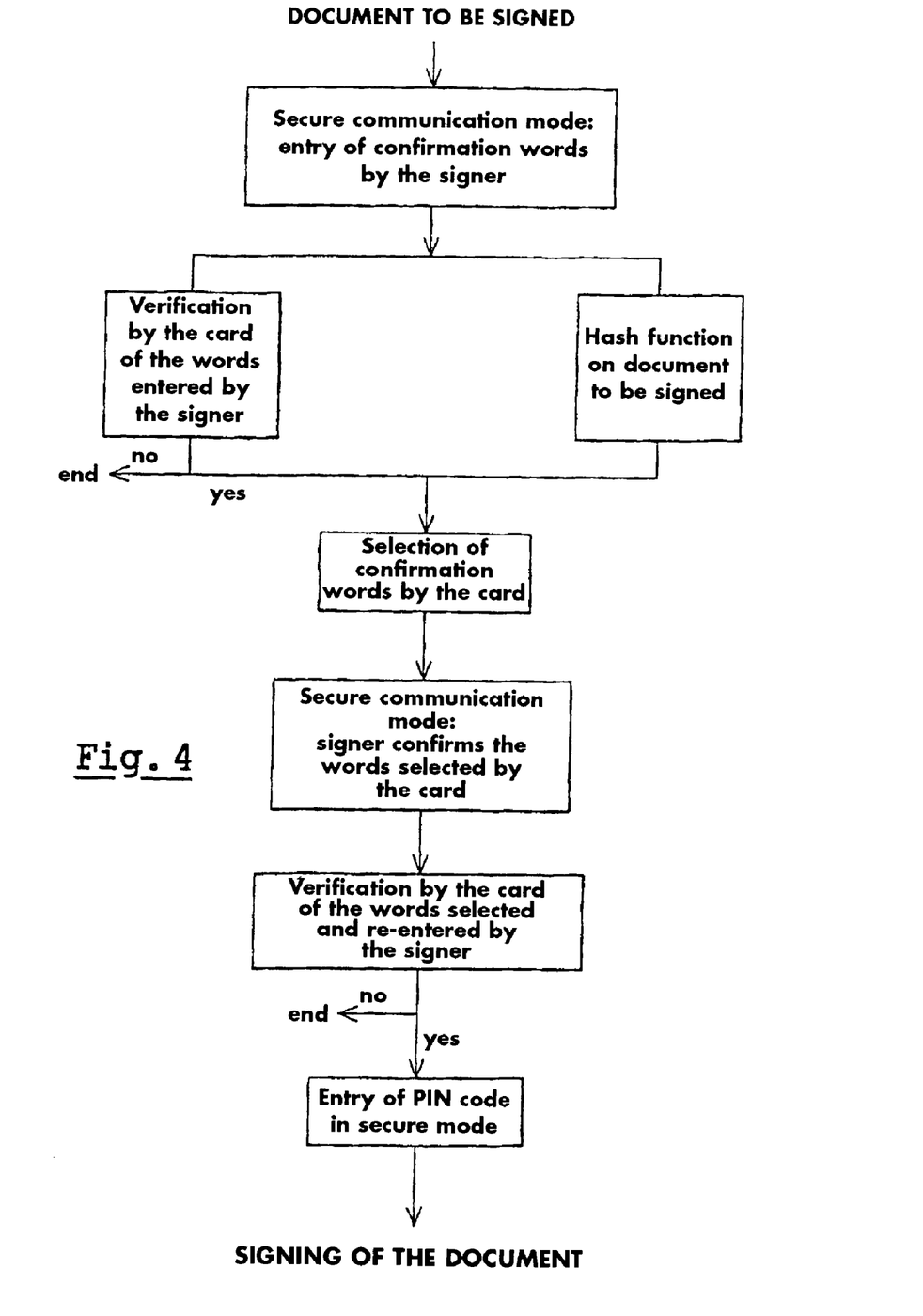
FIG. 4 is a flow diagram of the implementation of the method according to the invention, applied to the signing of a document, with a GemPC420 reader.

The implementation of the method according to the invention is summarised in the following complete example, with reference to the flow diagram of FIG. 4:

The method is implemented by adapted software stored on a PC capable of communicating with a smart card by means of a GemPC420 reader.

1. The software displays on the screen of the user the document to be signed (the example of FIGS. 2 and 3 is still being used).

2. The software switches the GemPC420 into mode 3. The user verifies that the green LED is flashing.

3. The user indicates to the card the words he wishes to enter for confirmation by entering "l2w5-8 sum of ninety francs l3wl Mr".

4. The software switches the GemPC420 into mode 2, and then transmits the text to be signed to the card. If the volume of text to be signed is large, the card can hash it on the fly, while performing the following two steps.

5. The card verifies that the entry of the user is consistent compared with the text received, otherwise the protocol terminates (Trojan horse attacks are thus avoided).

6. The card chooses words that the user must enter for confirmation. For example, the card selects the date, and then at random column 17 and the word "Pierre". The card transmits this choice to the software.

7. The software changes the words to be confirmed to red or highlighted and switches the GemPC420 into mode 3. The user verifies that the green LED is flashing.

8. The user enters the data requested by the card for confirmation: "l4w2-4 31 Jan. 2000 c17 duua 11w4 Pierre".

9. The card verifies that the confirmation data are compatible with the document received, otherwise the protocol terminates (Trojan horse attacks and/or first party attacks are thus avoided).

10. The software requests the user to enter his PIN code in order to confirm his wish to sign the document (the GemPC420 being in mode 3). The user verifies that the green LED is flashing.

11. The user enters his PIN code.

Figure 5:
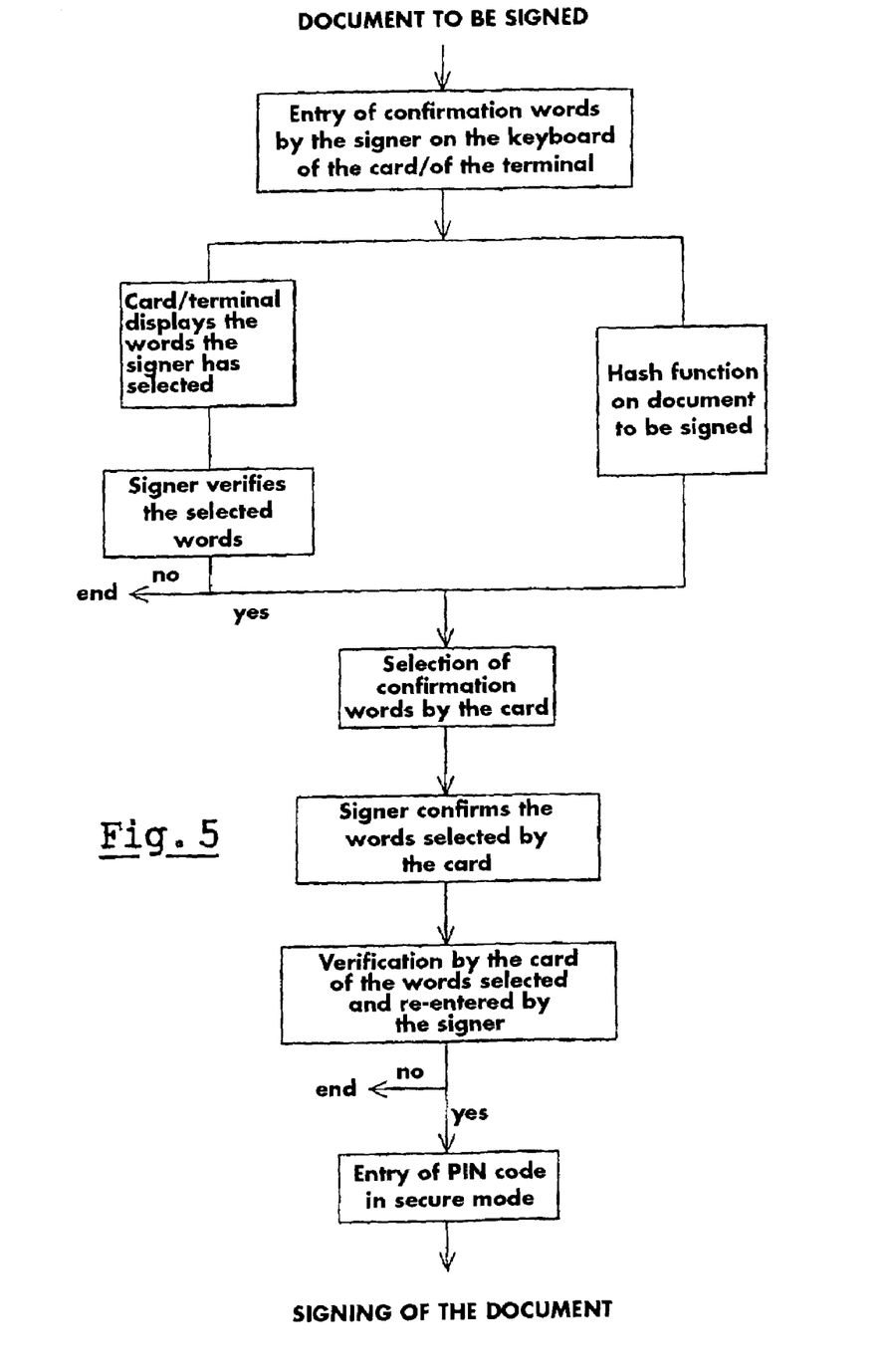
FIG. 5 is a flow diagram of the implementation of the method according to the invention, applied to the signing of a document, with a reader or a card having integrated keyboard and screen.

12. The card verifies the PIN code and, if it is correct, signs the document and returns the signature to the software.

Where a card reader or a card having an integrated screen and keyboard is available, the signing procedure is reduced as follows with reference to the flow diagram of FIG. 5:

1. The software displays on the screen of the user the document to be signed (the example of FIGS. 2 and 3 is still being used).

2. The user indicates the words he wishes to enter for confirmation by entering at the keyboard of the reader (of the card) "l2w5-8 l3wl".

3. The software transmits the text to be signed to the card. If the volume of text to be signed is large, the card can hash it on the fly, while performing the following two steps.

4. The reader (the card) displays the words the user has asked to be confirmed "l2w5-8 sum of ninety francs 13wl Mr".

5. The user verifies that these confirmation words indeed correspond to the text he wishes to sign, otherwise the protocol terminates (Trojan horse attacks are thus avoided).

6. The card chooses words the user must enter for confirmation. For example, the card selects the date, and then at random column 17 and the word "Pierre". This choice is displayed on the screen of the reader or card.

7. The user enters at the keyboard of the reader (of the card) the words to be confirmed: "l4w2-4 31 Jan. 2000 c17 duua 11w4 Pierre".

8. The card verifies that the confirmation data are compatible with the document received, otherwise the protocol terminates (Trojan horse attacks and/or first party attacks are thus avoided).

9. The software requests the user to enter his PIN code in order to confirm his wish to sign the document.

10. The user enters his PIN code.

11. The card verifies the PIN code and, if it is correct, signs the document and returns the signature to the software.

The method according to the invention can also be implemented on GSM type terminals (mobile telephones) or PDAs (Personal Digital Assistants) provided that the latter have at least one function key or a sequence of function keys intended to activate a secure mode, and an output making it possible to ascertain whether or not the secure mode is activated.

A number of possibilities of implementation of the method according to the invention can be envisaged.

The first consists of producing an interface between the system proposed by the invention (the software implementing the method according to the invention which is capable of controlling the card reader and of providing the instructions to the user) and software packages such as Word or Excel which are extensible. Within this context, it is necessary to code in Visual Basic an interface with the signature APIs (Application Programming Interfaces) and the functionalities for highlighting in the text the words to be re-entered.

Another possible implementation of this system can be obtained by integrating the software for implementing the invention into a Web page by means of a Java application.

Furthermore, one of the drawbacks of the method according to the invention lies in the effort necessitated by the entry of certain words by the user, which runs counter to the evolution of interfaces towards more user-friendliness. One solution to this problem can consist of adding to the system implementing the invention a secure mini-scanner connected to the same communication port as the reader or directly on the reader itself. Where the reader and the mini-scanner are connected to the same port, the reader will of course be disposed between the PC and the mini-scanner as in the case of the keyboard for the GemPC420. The mini-scanner allows the user to enter words displayed on the screen or printed, which saves him a new entry.

The protection method according to the invention can also be applied to the problem of modification of commands sent to the card by a Trojan horse.

To that end the invention proposes a method for protection against modification of the command sent to the secure medium (the smart card in the example under consideration). This method implements the same steps as the one described with reference to protection against modification of a signed document.

Figure 6:
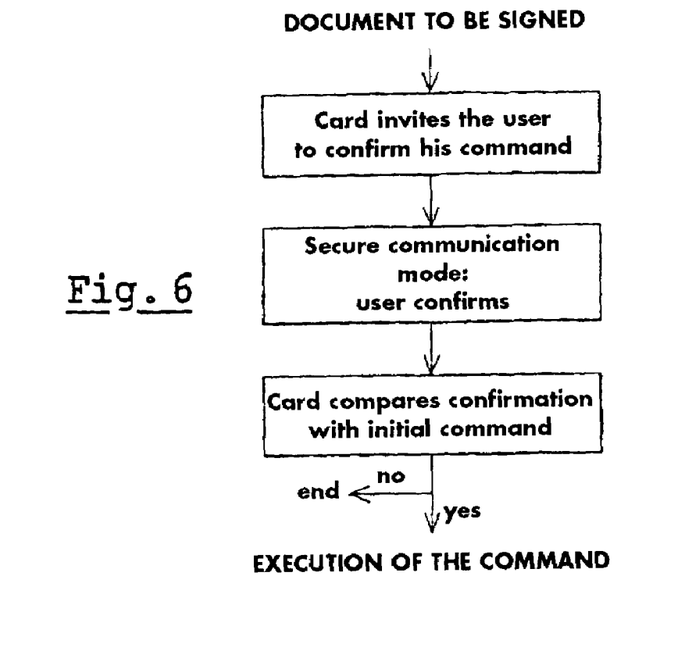
FIG. 6 is a flow diagram of the implementation of the method according to the invention, applied to the generation of a command, with a GemPC420 reader.

After having received the command, an on-board key generation command for example, the card will request the user to confirm this command.

Where the secure medium is coupled to a GemPC420 reader, the method progresses according to the following steps with reference to FIG. 6:

1. The user is invited to confirm his command by a message displayed on the screen of the PC.

2. The software switches the GemPC420 into mode 3. The user verifies that the green LED is flashing.

3. The user confirms his command (for example by typing GENK for on-board key generation).

Figure 7:
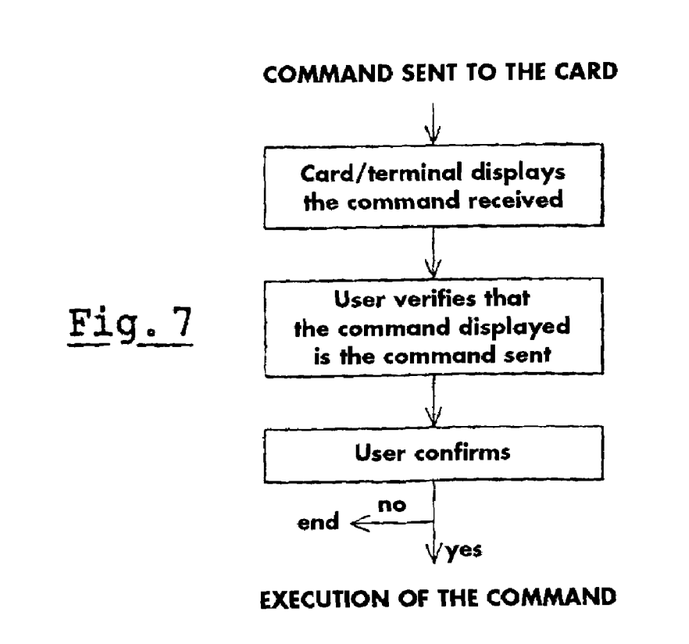
FIG. 7 is a flow diagram of the implementation of the method according to the invention, applied to the generation of a command, with a reader or a card having integrated keyboard and screen.

4. The card compares the entry of the user with the command received. If the comparison has a negative result, the protocol terminates, otherwise the card executes the command (generating the key).

Where a terminal or a card with integrated screen and keyboard is used, the method progresses according to the following steps with reference to FIG. 7:

1. The command received by the card is displayed on the screen of the terminal.
2. The user verifies that it is the command he wishes to produce, and then confirms by means of a function key on the terminal or terminates the protocol.

The invention claimed is:

1. A method for protection against modification of data sent by a user from a terminal to a secure medium via a reader, wherein at least one of the terminal and the card reader is associated with a user data entry device, comprising the steps of selecting certain items of the data and storing the selected items in the secure medium, receiving data items entered via the user data entry device at the secure medium in a secure communication mode of the reader, in which the user-entered items are provided to the secure medium without being provided to the terminal, and confirming the authenticity of said selected data items in the secure medium, by verifying that they are identical to those received in the secure communication mode of the reader.

2. A protection method according to claim 1, wherein the data is a command.

3. A protection method according to claim 2, wherein the command is a key generation command.

4. A protection method according to claim 1, wherein the data is a document to be signed with an electronic signature generated by the secure medium.

5. A protection method according to claim 4, wherein said steps comprise selecting certain words of the document to be signed and storing them in the secure medium, and obtaining confirmation of the authenticity of said document by verifying that said selected words are identical to those received in a secure communication mode of the reader.

6. A protection method according to claim 5, wherein the words selected for confirmation are selected by the user in a secure communication mode.

7. A protection method according to claim 5, wherein the words selected for confirmation are selected by the secure medium.

8. A protection method according to claim 7, wherein the words selected by the secure medium are selected randomly.

9. A protection method according to claim 7, wherein the words selected by the secure medium are selected deterministically, when the document to be signed is a structured document.

10. A protection method according to claim 9, wherein the secure medium selects for confirmation the words corresponding to numbers.

11. A protection method according to claim 4, further comprising the steps of requesting confirmation of the location in the document of the words selected for confirmation.

12. A protection method according to claim 11, wherein the location of the selected words is defined by the line and column numbers of the document to be signed.

13. A protection method according to claim 12, wherein the secure medium selects as confirmation words an entire column and/or an entire line of the document to be signed.

14. A protection method according to claim 4, wherein the document to be signed is in ASCII format.

15. A terminal capable of communicating with a secure medium by means of a reader having a secure mode of communication between the medium and the reader, said secure mode providing information to the secure medium without providing the information to the terminal, and a program capable of implementing the following steps:
receiving data at the secure medium;
identifying at least a portion of the received data for verification purposes;
requesting entry of confirmation data from a user;
receiving user-entered confirmation data at the secure medium in a secure communication; and
comparing the received user-entered confirmation data with the identified portion of the received data in the secure medium to verify the authenticity of the received data.

16. A terminal according to claim 15, comprising at least one function key for activating the secure mode of the reader.

17. A terminal according to claim 15, further comprising a mini-scanner having a secure mode of communication with the terminal.

18. A terminal according to claim 15, wherein said terminal is constituted by a mobile telephone.

19. A terminal according to claim 15, wherein said terminal is constituted by a personal computer.

20. A terminal according to claim 15, wherein said terminal is constituted by a smart card provided with an integrated screen and keyboard.

21. A terminal according to claim 15, wherein said terminal is constituted by a personal digital assistant.

22. A terminal according to claim 15, wherein the secure medium is constituted by a smart card.

23. A terminal according to claim 15, wherein the secure medium is constituted by a PCMCIA card.

24. A smart card capable of communicating with a terminal via a reader having a secure communication mode in which information is provided to the smart card without being provided to the terminal, and including a program capable of implementing the following steps:
selection and storage of data received from the terminal in a non-secure communication mode;
requesting confirmation of said data;
receiving data from the reader in the secure communication mode; and
comparison of the stored data received from the terminal with the data received from the reader in the secure communication mode to confirm the authenticity of the data received from the terminal.

* * * * *